June 7, 1927.

P. E. MATTHEWS

OILING SYSTEM FOR BEARINGS

Filed June 27, 1925

INVENTOR
Philip E. Matthews
BY
Redding, Greeley, O'Shea & Campbell
ATTORNEYS.

June 7, 1927.                                                1,631,217
P. E. MATTHEWS
OILING SYSTEM FOR BEARINGS
Filed June 27, 1925                    2 Sheets-Sheet 2
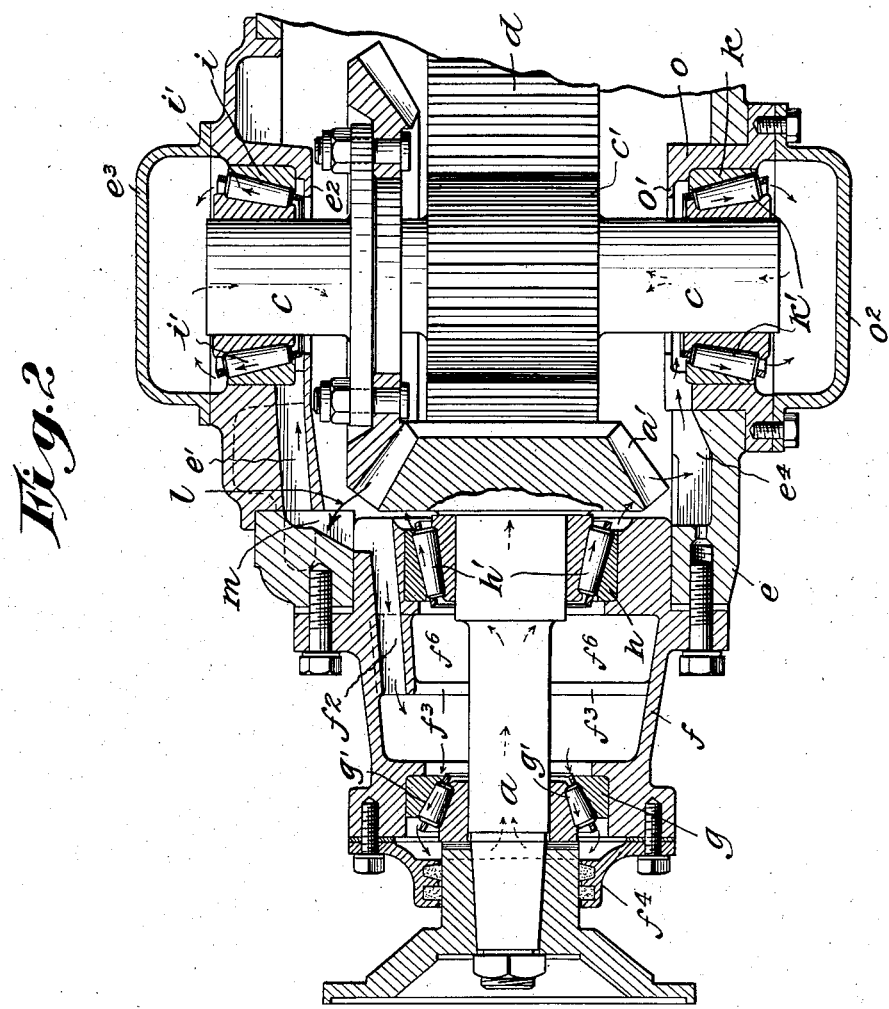
INVENTOR
Philip E. Matthews
BY
Redding, Greeley, O'Shea & Campbell
ATTORNEYS Patented June 7, 1927.

1,631,217

UNITED STATES PATENT OFFICE.

PHILIP E. MATTHEWS, OF PLAINFIELD, NEW JERSEY, ASSIGNOR TO INTERNATIONAL MOTOR COMPANY, OF NEW YORK, N. Y., A CORPORATION OF DELAWARE.

OILING SYSTEM FOR BEARINGS.

Application filed June 27, 1925. Serial No. 39,908.

This invention relates to the problem of adequately lubricating the bearings for moving parts in enclosed casings in motor vehicles. In the assemblies of various units such as transmissions and final drives for motor vehicles, bearings are often necessarily located in relatively remote places where they cannot receive adequate lubrication by splash. The present invention relates to means by which the lubricant may be conveyed under all circumstances from the main reservoir to the bearings and circulated constantly by the action of the bearings themselves the result being what might be properly termed by analogy a force-feed system as distinguished from a splash system even though the action of the bearings themselves is depended upon to maintain the necessary pressure differential for circulation. In accordance with the invention the means employed are simple and self-embodied and entail no additional moving parts. Channels and dams are provided within the casings in such relation to splashing members and bearings as to create a complete circulatory system through which the lubricant is constantly conveyed. Return channels may similarly be employed when necessary. It has been found in practice that the invention lends itself particularly to the incorportion in units where tapered roller bearings are provided although it is in nowise so limited in so far as the principle disclosed and claimed herein may be useful with other types of bearings. Further, while its application to a final drive employing double reduction gearing is illustrated for purposes of illustration it will become evident as the description proceeds that its usefulness is not to be so restricted since it may be employed to equal advantage in any unit where there are revolving gears and bearings.

Reference is now to be had to the accompanying drawings for a detailed description of the illustrated embodiment in which drawings:

Figure 2 is a view in longitudinal horizontal section of a fragment of the case shown in Figure 1 and taken on the plane indicated by the line 2—2 of Figure 1 and looking in the direction of the arrows.

Figure 1:
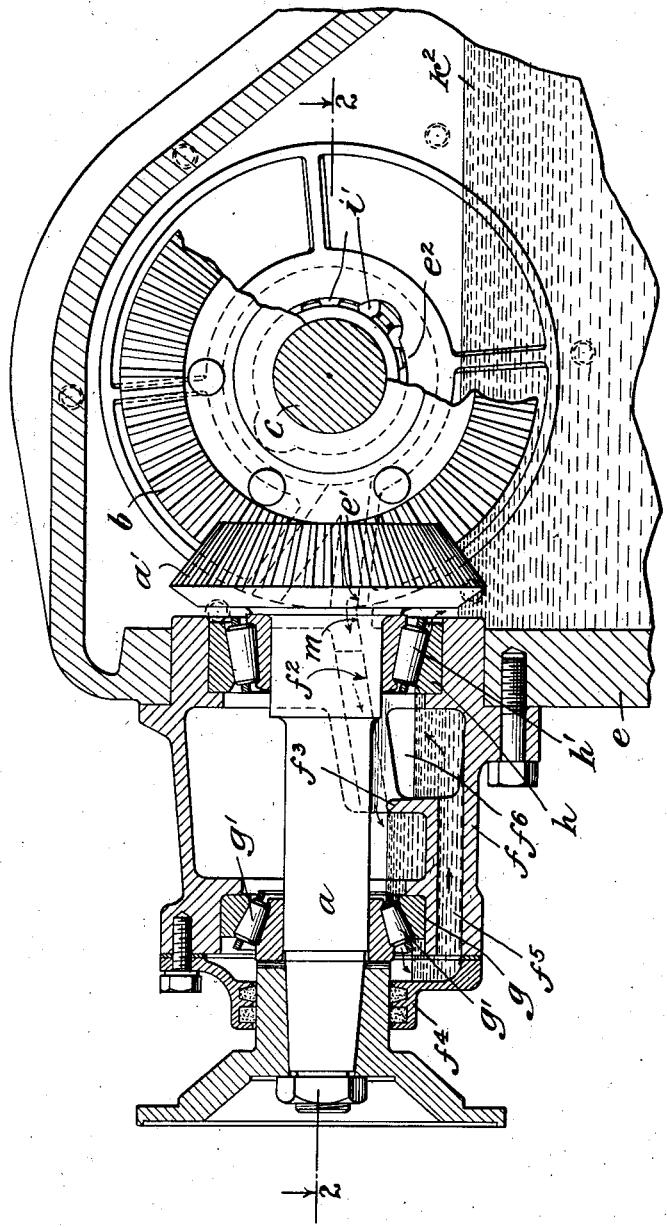
Figure 1 is a view in longitudinal vertical section through the fragment of a case for a final drive having double reduction gearing, arrows indicating the circulatory system of the lubricant.

As pointed out hereinbefore the gears, shafts, bearings and casing illustrated in the drawings appear merely by way of illustration so that the principle underlying the invention may be made clear but no restriction is to be imposed on the scope of the invention by the form or arrangement of such parts as shown since the invention is not concerned with them. Figure 1 illustrates a driven shaft section $a$ which may be coupled to the propeller shaft and carries at its end a final drive bevel pinion $a'$ which meshes with a bevel pinion $b$ carried on a stub shaft $c$ which imparts a double reduction drive through a final drive spur pinion $c'$ thereon meshing with the spur ring gear $d$ for the differential gear. The parts referred to are housed within a main casing $e$ on the front wall of which may be attached a separate small casing $f$ in which the shaft section $a$ is journaled, in accordance with known practice. The shaft $a$ must be supported adjacent its ends and for this purpose bearings indicated generally at $g$ and $h$ are provided within the small casing $f$. Similarly, the stub shaft $c$ for the spur pinion $c'$ must be journaled at its ends and for this purpose bearings indicated generally at $i$, $k$, are provided within the side walls of the main casing $e$. The bearing $g$ presents a problem of lubrication and illustrates the application of one aspect of the invention where means are provided to circulate the lubricant from the main casing $e$ over its bearing members constantly. The bearings $i$ and $k$ illustrate another aspect of the same problem found generally in transmission work for while they are not remote from the lubricant itself and are found within the walls of the transmission casing they are so located with respect to the revolving members as to ordinarily receive an adequate supply of the lubricant by splash.

The matter of lubricating of a remote bearing will first be considered. The ring gear $d$ revolves within the lubricant indicated at $k^2$ within the main case $e$ and carries a regular supply of lubricant to the final drive spur pinion $c'$. This pinion in turn splashes oil on the bevel pinions $a'$, $b$, which are in proximity to it. The teeth of these pinions at the points where they mesh squeeze the oil or pump it out laterally as indicated by the arrow $l$. A shoulder or ledge $m$ opposite this stream is formed on the inner wall of the casing $e$ or a part thereof to receive the oil. From this ledge extends forwardly through the rear wall of the casing $f$ a channel $f^2$ by which the oil accumulating on the flange $m$ is led forwardly within the casing $f$ and discharged thereinto. A flange $f^3$ within the casing $f$ adjacent its bottom serves as the dam to trap the oil thus delivered and maintain its level above the proximate bearing members in the bearing $g$. It will be noted from Figure 1 that the flow of oil into the casing in the manner described may be best assured and facilitated by inclining the channel $f^2$ downwardly and forwardly, this channel being shown in dotted lines. Tapered roller bearings are miniature pumps when immersed in liquid and serve to pump any liquid in which they revolve through them in a direction from the smaller end of the bearing members towards the larger end. For this reason, the oil trapped within the casing $f$ being at a level in which the lowermost bearing elements $g'$ revolve is constantly pumped by these bearing elements from right to left as viewed in Figures 1 and 2 and in this way, the bearing elements are constantly lubricated. A space to receive this oil is formed behind the bearing elements $g'$ within the cap $f^4$ for the casing and this space communicates with a return channel $f^5$ at the bottom part of the casing $f$, this return channel terminating in a space or reservoir $f^6$ immediately in rear of the dam $f^3$ and open to the bearing elements $h'$ in the bearing $h$. The level of the lubricant within the space $f^6$ is maintained at a height as to constantly provide a lubricant for the bearing elements $h'$. These bearing elements are, of course, so assembled as to take the oil from the space $f^6$ and pump it through into the main casing $e$.

From the description given and having reference to the arrows shown in Figures 1 and 2 it will be clear that a complete circulatory system has been established by the improved means by which the bearing elements themselves acting as pumps constantly maintain a flow of lubricant from the main casing over the remote bearings and return. No additional moving parts are employed and yet a force-feed system is the result.

Turning now to the other conditions set up within the main casing $e$ by failure of the bearings $i$ and $k$ to receive adequate lubrication through splash it will be seen that the flange $m$ where oil is collected is placed in communication with the bearing $i$ by a separate channel $e'$ which delivers oil in proximity to the smaller ends of the tapered bearings. A flange $e^2$ is formed opposite the smaller ends of these tapered bearings but spaced therefrom so that the oil when and as received from the channel $e'$ will be dammed up and retained to a desirable degree to permit the pumping action heretofore described to be carried on constantly by the bearing elements $i'$. The oil held by the flange $e^2$ is pumped by these bearing elements in the direction of the arrows shown in Figure 2 and discharged at the backside of the bearings into the space within the closing cap $e^3$ from which space it may return through ducts to the main reservoir. The condition at the opposite end of the stub shaft $c$ at its bearing $k$ is somewhat similar. A flange or collecting ledge $e^4$ is provided on the inner wall of the casing $e$ in such relation to the revolving bevel pinion $a'$ as to receive oil thrown therefrom and deliver it in proximity to the smaller ends of the bearing members $k'$. The support $o$ for the bearing $k$ is flanged at its end as indicated at $o'$ this flange being in spaced relation to the inner side of the bearing and serve to retain the oil delivered through the channel $e^4$ for the pumping action of the rollers $k'$. The oil pumped through the rollers into the space within the cap $o^2$ may subsequently return to the main casing $e$ through openings provided therefor.

The condition just described with respect to the bearings $i$, $k$, is not an unusual one in any enclosed casings where there are revolving gears. The means provided to insure constant lubrication of the bearings may include any form of collecting recess or channel or flange and any form of connecting conduit either as an open channel or a pipe or the equivalent. Further, the equivalent of the dams herein referred to may be provided by one skilled in the art.

Changes or variations as indicated may be made so long as the principle is retained without avoiding the spirit of the appended claims.

What I claim is:

1. In combination with an enclosed casing and members mounted therein to revolve in a lubricant and tapered roller bearings in which said revolving members are journaled, means to constantly circulate the lubricant to such bearings including collecting means for the lubricant conveyed by the revolving members and channels by which the lubricant is led from said collecting means into proximity with the bearings, and means for maintaining the lubricant so conveyed at the level of the bearings.

2. In combination with an enclosed casing and members mounted therein to revolve in a lubricant and tapered roller bearings in which said revolving members are journaled, means to constantly circulate the lubricant to such bearings including collecting means for the lubricant conveyed by the revolving members and channels by which the lubricant is led from said collecting means into proximity with the bearings, means for maintaining the lubricant so conveyed at the level of the bearings, and means to return the lubricant to the main body of lubricant after passage through the bearings.

3. In combination with a casing having revolving gears therein adapted to rotate within a lubricant, tapered roller bearings in which the parts are journaled within the casing, collecting means to receive lubricant thrown up by the revolving members, channels to deliver the lubricant so collected to the roller bearings, and means to maintain the lubricant so delivered at a predetermined depth with relation to said bearings.

4. In combination with a casing having revolving gears therein adapted to rotate within a lubricant, tapered roller bearings in which the parts are journaled within the casing, collecting means to receive lubricant thrown up by the revolving members, channels to deliver the lubricant so collected to the roller bearings, means to maintain the lubricant so delivered at a predetermined depth with relation to said bearings, and return channels through which said lubricant is delivered back into the main body.

5. In combination with gearing adapted to revolve in a lubricant within a casing, a flange formed on the wall of the casing to receive lubricant thrown onto it by said revolving gears, a channel leading from the flange to deliver lubricant into proximity to tapered roller bearings remote from said gearing, means to maintain the lubricant so delivered at a predetermined depth with respect to said bearings, and means to conduct the lubricant back to the casing, whereby constant circulation of the lubricant is maintained.

6. In combination with a casing having revolving gears journaled therein and adapted to rotate in a lubricant, a ledge formed on the inner wall of the casing to receive lubricant from said gears, a shaft journaled on tapered roller bearings, the taper of said rollers being opposed, a channel leading from said ledge to a point between said bearings to deliver lubricant, a reservoir to hold the lubricant so delivered in proximity to one of said bearings whereby the tapered rollers will receive such lubricant and pump it past themselves, and a return passage to deliver said lubricant to the other of said bearings.

7. In combination with a casing having revolving gears journaled therein and adapted to rotate in a lubricant, a ledge formed on the inner wall of the casing to receive lubricant thrown onto it by said revolving gears, a shaft journaled in a plurality of tapered roller bearings, one of which is more remote from said revolving gears than the other, the taper of said rollers being opposed, a reservoir, a channel leading from said ledge to deliver lubricant to said reservoir in proximity to the more remote of said bearings whereby the tapered rollers will receive such lubricant and pump it past themselves, a second reservoir, and a channel to receive lubricant from said more remote bearing and conduct it to said second named reservoir whereby the tapered rollers will receive such lubricant and pump it past themselves and back into the casing.

8. In combination with a casing having revolving gears journaled therein and adapted to rotate in a lubricant, ledges formed on the inner wall of the casing to receive lubricant thrown onto it by said revolving gears, a shaft journaled in a plurality of tapered roller bearings, reservoirs formed in the casing in proximity to the smaller ends of said bearings, channels to conduct lubricant from said ledges to said reservoirs whereby the tapered rollers may receive such lubricant and pump it past themselves and back into the casing, a second shaft journaled in a plurality of tapered roller bearings, the taper of said rollers being opposed, reservoirs formed in the casing in proximity to the smaller ends of said bearings, a channel to conduct lubricant from one of said ledges to the reservoir in proximity to the smaller end of the bearing more remote from said gears whereby the tapered rollers may receive such lubricant and pump it past themselves, and a channel adapted to receive lubricant from the last-mentioned bearing and conduct it to the reservoir in proximity to the smaller end of the bearing less remote from said gears whereby the tapered rollers of such bearing may receive the lubricant and pump it past themselves and back into the casing.

This specification signed this 19th day of June A. D. 1925.

PHILIP E. MATTHEWS.